July 27, 1937.　　　T. M. RECTOR　　　2,088,012
APPARATUS FOR VACUUMIZING
Filed June 16, 1931　　　3 Sheets-Sheet 2
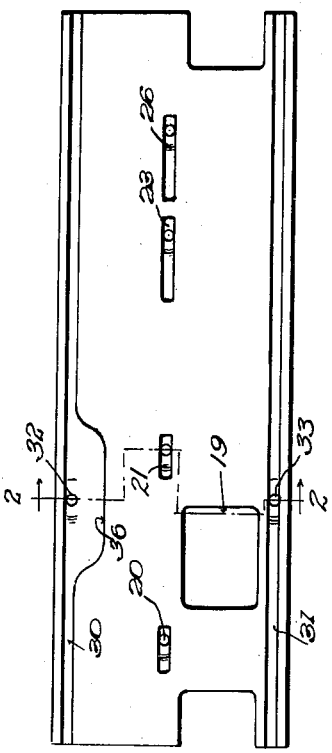
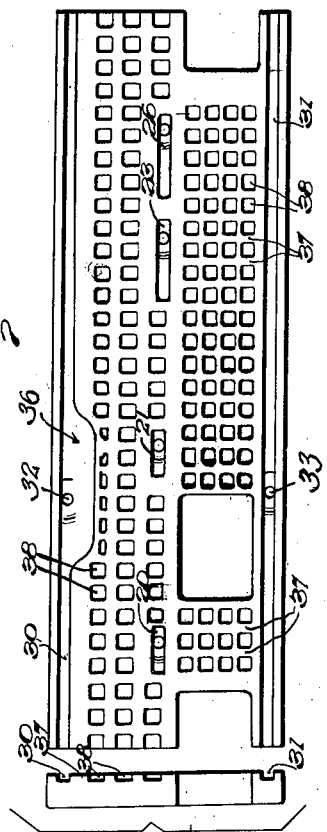
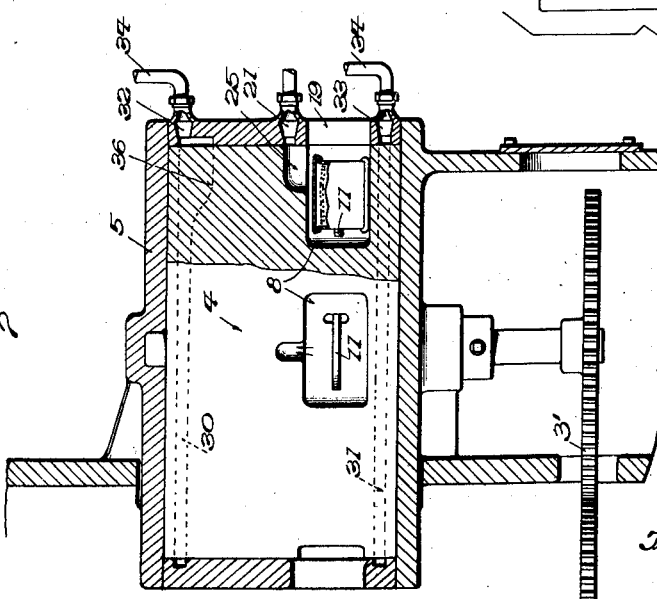
Inventor
Thomas M. Rector.
By Cameron, Kerkam & Sutton
Attorneys

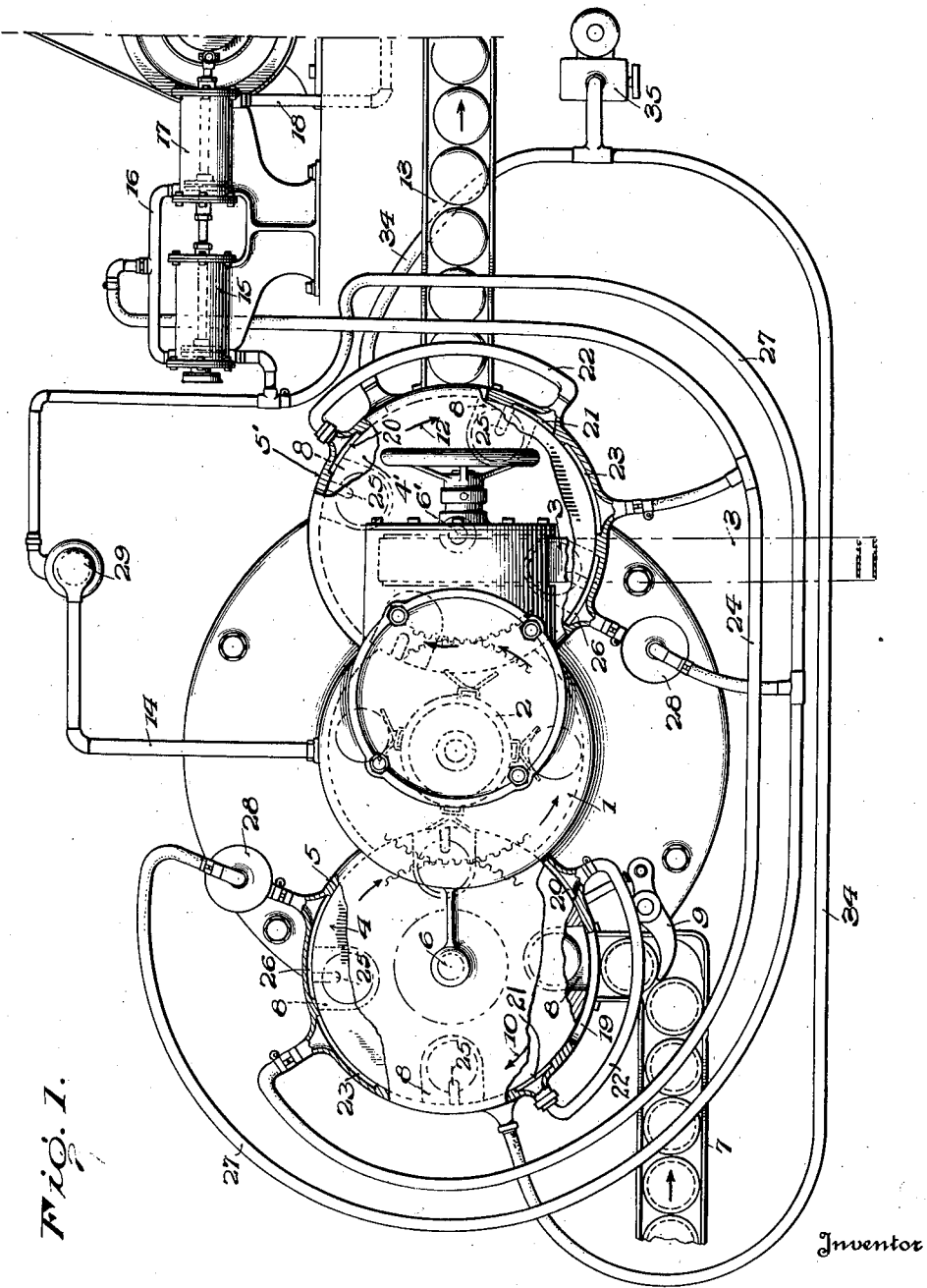

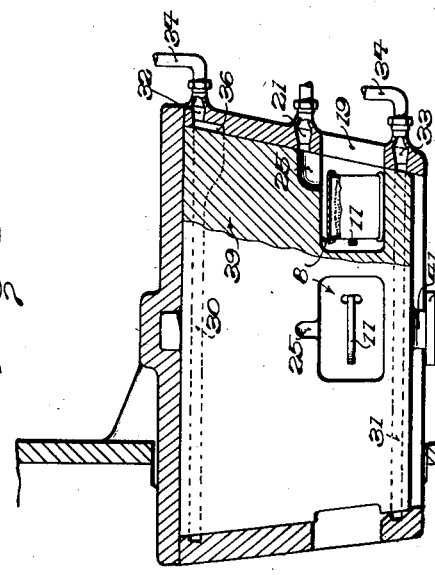

Patented July 27, 1937

2,088,012

UNITED STATES PATENT OFFICE 2,088,012

APPARATUS FOR VACUUMIZING

Thomas M. Rector, Rutherford, N. J., assignor, by mesne assignments, to General Foods Corporation, New York, N. Y., a corporation of Delaware Application June 16, 1931, Serial No. 544,867

26 Claims. (Cl. 226—82)

This invention relates to a method of and vacuumizing apparatus for packaging food products in vacuumized sealed containers.

In packaging food products such as coffee, for example, it is desirable to pack the coffee in a vacuumized sealed container in order to prevent deterioration due to the action of oxygen on the coffee. Many different types of vacuumizing apparatus have been devised for such purposes. In general, apparatus of this kind includes a vacuumizing chamber in which the coffee cans are sealed under vacuum together with rotary valve mechanism for delivering the filled cans into the sealing or seaming chamber and for removing the sealed or seamed cans from the chamber. Usually separate rotary valves are employed for these purposes, although in some instances a single rotary valve suffices. These rotary valves comprise a cylinder rotating within a casing, the walls of which are in contact with the rotating surface of the cylinder so as to form as near as possible an air-tight seal and the cylinder being provided with a plurality of pockets. The cans are fed by suitable mechanism into the pockets of the rotary valve and are carried in the pockets into the seaming chamber where they are transferred to the seaming mechanism. The cans are transferred from the seaming mechanism to the pockets after they have been seamed in order to remove them from the seaming chamber.

In the usual apparatus of this kind, the vacuum is obtained by means of a vacuum pump which is applied to the seaming chamber. Owing to the leakage of air around and past the rotating valve mechanisms, and owing to the fact that each pocket of the rotating valve carries into the seaming chamber a pocketful of air, it is difficult to obtain with vacuum pumps of practicable and economical sizes a vacuum in the seaming chamber greater than 27 to 27½ inches. It has been found, however, that this amount or value of vacuum does not obtain a sufficient removal of air for preserving against deterioration many food products. In the case of coffee, for example, it is very desirable to remove the last traces of air from the cans before they are seamed because even slight traces of oxygen will cause easily perceptible changes in the coffee which result in a stale or rancid product.

In order to obtain a higher vacuum in the cans, or in other words, to maintain a higher vacuum in the seaming chamber, it has been proposed to evacuate the pockets of the rotary valves by means of a groove in the casing surrounding the rotating valve and a connection from the groove to the vacuum pump which evacuates the seaming chamber or to a separate pump. In packaging coffee and like products, however, it is desirable to obtain a very high vacuum in the cans of the order of 29½ inches or more, and the arrangements heretofore devised for vacuumizing the valve pockets have not been effective to obtain the desired value of vacuum in the cans.

One of the objects of the present invention is to provide novel means for vacuumizing apparatus of this character whereby a very high vacuum or low pressure of the order of one or two millimeters of mercury can be obtained in the cans.

Another object is to provide a novel vacuumizing apparatus of the class described wherein the pockets of the rotating valve mechanisms are evacuated in stages to a very high value before the cans are delivered to the seaming chamber.

A further object is to provide a novel valve structure arranged to provide an efficient vacuumizing of the valve pockets before they are in communication with the interior of the seaming chamber.

Another object is to provide a novel valve structure embodying a vacuum seal for preventing air from entering the valve pockets.

Another object is to provide a novel valve structure wherein the vacuum effects are balanced so as to avoid unbalanced pressures on the valve member which would result in uneven wear of the valve member in its casing.

A further object is to provide a novel valve structure embodying a conical valve member and valve seat whereby a constant air-tight relationship is maintained and the valve member is ground in the seat by gravity.

A still further object is to provide a novel valve structure embodying a conical valve and valve seat and means whereby the effects of gravity are partially compensated so as to maintain an air-tight condition between the valve member and its seat while minimizing friction and wear between the parts.

Another object is to provide a novel arrangement of vacuum pumps whereby the operation of vacuumizing apparatus of the class described is made more efficient and economical.

A further object is to provide a novel method for vacuum packing comminuted materials whereby the air is first exhausted gradually from the containers to prevent displacement of the materials from the containers and between the sealing edges of the container, and after the greater part of the air has been removed, the remaining air is exhausted rapidly in order to obtain as high a value of vacuum as possible before the containers are sealed.

The invention has been illustrated in the accompanying drawings, but it is to be expressly understood that said drawings are for purposes of illustration only and are not to be construed as a definition of the limits of the invention, reference being had to the appended claims for this purpose.

In the drawings:

Fig. 1 is a diagrammatic plan view, partly in section, of a vacuumizing apparatus including the seaming mechanism, rotating valves and vacuum pumps;

Fig. 2 is an elevation, partly in section of one of the rotating valves, the valve casing section being on the line 2—2 of Fig. 3;

Fig. 3 is a developed view of the inner surface of the valve seat shown in Fig. 2;

Fig. 4 is a developed view of the inner surface of another form of valve seat;

Fig. 5 is an end view of Fig. 4;

Fig. 6 is an elevation partly in section of a conical valve member and its casing, the casing section being taken on line 6—6 of Fig. 7;

Fig. 7 is a developed view of the inner surface of the valve seat shown in Fig. 6 distorted to render the top and bottom edges straight rather than curved;

Fig. 8 is a distorted developed view, similar to Fig. 7, of the inner surface of another form of valve seat; and Fig. 9 is an end view of Fig. 8.

Referring now to Fig. 1, the can sealing or seaming apparatus is mounted on a suitable base and includes a central seaming chamber 1 in which is seaming mechanism of any suitable type indicated generally at 2. It will be understood that the form of the seaming mechanism constitutes no part per se of the present invention and that any suitable or known seaming mechanism may be employed. This mechanism may be operated through any suitable mechanism driven by suitable means such as a belt 3. In the form shown, the apparatus includes two rotary valves 4 and 4', one of which delivers the filled but unsealed cans to the seaming chamber and the other of which removes the filled and seamed cans from the seaming chamber. These valves rotate in valve casings 5 and 5', respectively, and are rotated preferably continuously about axes 6 and 6' through any suitable gearing 3' driven from the belt 3. The filled cans may be delivered to the apparatus by any suitable conveyor 7 and are fed one by one into the pockets 8 of the rotating valve 4 through an opening in the valve casing 5 by suitable means such as a rocking arm 9. The cans are carried in the pockets of the valve, which rotates in the direction shown by arrow 10, into the seaming chamber where they are ejected from the pockets by any suitable ejector 11 (Fig. 2) and delivered to the seaming mechanism. After the cans have been seamed, they are delivered one by one to the pockets of the rotating valve 4' which rotates in the direction of the arrow 12, and are ejected from the pockets onto a suitable conveyor 13. It will be understood that the apparatus thus far described is of conventional construction well known in the art and that the particular form of mechanism described constitutes no part per se of the invention.

Air is withdrawn from the seaming chamber 1 through a pipe 14 which leads to a suitable vacuum pump. In the form shown, a two-stage vacuum pump is employed, the pipe 14 leading to the first stage 15 of said pump which is in turn connected by a pipe 16 to the second stage 17 of the pump, the air being evacuated from the second stage to atmosphere through pipe 18. The two-stage vacuum pump 15, 17 may be of any suitable or known type, and is preferably of sufficient capacity to maintain a vacuum in the first or high vacuum stage of about 29½ inches. In the pipe 16 and in the second stage, the vacuum should preferably be about 27 to 27½ inches.

In order to evacuate air from the pockets of the rotating valves and to prevent these pockets delivering air to the seaming chamber, suitable means are provided for withdrawing air from the pockets while they rotate within the valve casing and before they are in communication with the seaming chamber. Preferably this means is arranged to evacuate the pockets in a plurality of stages of increasing values of vacuum, whereby air is withdrawn gradually from the pockets and from the unsealed containers therein. By withdrawing the air gradually, disturbances in the contents of the containers are avoided and none of the materials get between the sealing edges of the containers, and by connecting the several vacuum stages to a suitable arrangement of vacuumizing means as hereinafter described, greater efficiency and higher values of vacuum can be obtained.

In the form shown, the valve pockets are evacuated in three stages which are preferably the same for both the inlet and exit valves 4 and 4'. Referring to Figs. 1 and 2, the filled but unsealed containers are delivered to the rotating valve 4 through an opening 19 in the valve casing 5, and the sealed containers are discharged from the rotating valve 4' by a similar opening 19 in the valve casing 5'. The pockets which approach these openings are highly evacuated, having just left the seaming chamber, while the pockets which leave these openings have been in communication with the atmosphere and hence are filled with air. Accordingly, a preliminary evacuation of the pockets can be obtained by providing means whereby each pocket 8 as it leaves the opening 19 is connected with an evacuated pocket 8 which is approaching the opening 19. As shown in Fig. 1, grooves 20 and 21 are formed in the valve casings 5 and 5', the interval between these grooves being equal to the interval between each two pockets 8 of the rotating valve members. These grooves 20 and 21 are connected in any suitable manner, as by means of pipes 22, so that each valve pocket 8 as it leaves the opening 19 is connected with an evacuated pocket 8 approaching the opening 19. By this means the pockets are preliminarily evacuated without increasing the load on the vacuumizing unit 15, 17.

The other two stages of evacuation of the pockets are accomplished by suitable connections to the vacuumizing unit 15, 17, each pocket being first connected with the low vacuum stage 17 and second with the high vacuum stage 15. Referring again to Fig. 1, grooves 23 are formed in the valve casings 5 and 5', these grooves being connected in any suitable manner as by a common pipe 24 to the pipe 16 leading to the low vacuum stage 17. Preferably, the grooves 23 have a considerable peripheral extent, as clearly shown in Fig. 1, so that the time during which the pocket is subjected to the vacuum is made as large as possible. As shown in Fig. 2, the grooves 23 (and also the grooves 20 and 21) are formed in the valve casings at a point above the tops of the pockets 8 of the valves and communication between the grooves and the valve pockets is established by means of passages or slots 25 formed in the surface of the valve members and adapted to register with the grooves. By this means the rotating valve pockets are further evacuated to approximately 27½ inches.

The third stage of evacuation of the pockets is accomplished by means of grooves 26 formed in the valve casings 5 and 5' and connected in any suitable manner as by a common pipe 27 to the high vacuum stage 15. These grooves 26 are preferably at the same height as grooves 23 so that the passages 25 register therewith on continued rotation of the valve members. In this way the valve pockets are subjected to a vacuum of about 29½ inches before they come into communication with the seaming chamber.

As is shown most clearly in Fig. 1, the outer ends of passages 25 which register with the vacuumizing grooves 20, 21, 23 and 26 are of less extent peripherally of the valve members than either pockets 8 or the ungrooved portions of the valve casing walls which separate the adjacent ends of said grooves. With this construction, it is possible to locate the grooves closer together and to make them of greater peripheral extent than would be possible if they communicated directly with the open sides of the pockets, thereby permitting a longer period of evacuation in each stage.

When the valve pockets are placed in communication with the high vacuum stage 15, they have already been largely evacuated and hence rapid withdrawal of the remaining air in the pockets will not cause any substantial disturbance of the contents of the containers. Such rapid withdrawal is also desirable since the period of rotation of the valve which may be permitted for communication between the pockets and the pipe 27 is limited. Accordingly, expansion chambers 28 are interposed in the pipe 27 immediately adjacent its connection to each of the grooves 26. A high value of vacuum is maintained in each of these expansion chambers by the vacuumizing unit 15, 17 and as soon as the pockets come into communication with the grooves 26 the remaining air in the pockets rushes out quickly into the expansion chambers. In this way the effects of friction, inertia, etc., of the air in pipe 27 are avoided and the vacuum produced in the pockets and containers is increased.

In some cases it may be desirable to produce greater vacuum in the seaming chamber than would be obtained with the two-stage pump 15, 17. For example, if it is desired to increase the vacuum in the seaming chamber above 29½ inches to a point at which the pressure in the chamber and containers is of the order of one or two millimeters of mercury, a rotary booster pump 29 may be inserted in the pipe 14 leading from the seaming chamber to the high vacuum pump stage 15. The use of the booster pump 29 for the purpose of increasing the vacuum in the seaming chamber results in greater efficiency of operation than could be obtained if it were attempted to obtain the same vacuum by means of the pumps 15, 17.

One of the main sources of leakage of air into the pockets 8 is the leakage of air from the top and bottom of the valve member between the same and the surrounding casing. In order to prevent such leakage, vacuum seals are preferably provided at both the top and bottom of the valve member so that any air which tends to leak in between the valve member and its casing is withdrawn by a suitable vacuumizing means before it reaches the pockets 8. Referring to Figs. 2 and 3, vacuum sealing grooves 30 and 31 are formed, respectively, in the top and bottom of both valve casings 5 and 5', these grooves extending preferably around the entire periphery of the valve casings. Grooves 30 and 31 may be connected by means of outlets 32 and 33, respectively, to pipes 34 leading to a vacuum pump 35 of any suitable type.

The evacuation of the pockets of the rotating valve members and of the seaming chamber tends to cause an unbalanced pressure on the valve members. As viewed in Fig. 1, the valve pockets on the lower and left-hand side of the valve member 4 are evacuated to a less extent than the pocket at the upper side of the valve member, and moreover the entire right-hand side of the valve member rotates within the seaming chamber in which a high vacuum is maintained. As a result, an unbalanced pressure is created on the valve member which (as viewed in Fig. 1) tends to force it upwardly and to the right. A similar condition exists with regard to the valve member 4', and hence the valve members wear unevenly in their casings, run hot, and cause many mechanical troubles. In order to compensate at least in part this unbalanced pressure, evacuated areas are formed in the valve casings in such a position and of such size as to substantially balance the vacuum effects on the valves. In the form shown, these evacuated areas comprise enlargements of one or both of the sealing grooves 30, 31. Referring to Fig. 3, the sealing groove 30 is shown enlarged in width at 36, the enlarged portion compensating for the unbalanced pressure on the valve member to an extent depending on the evacuated area and the amount of vacuum in the groove. By this means excessive heating of the valve member and casing and uneven wear of the valve member in its casing are prevented, whereas with an unbalanced pressure the valve member would tend to wear more on one side of the casing than the other and would become loose in the casing so that air leakage would result between the valve member and casing on the loose side.

Means may likewise be provided for decreasing the friction between the valve member and casing by decreasing the area of the contacting surfaces while at the same time maintaining a tight fit to prevent air leakage. Referring to Figs. 4 and 5, the inner surface of the valve casings 5 and 5' may be formed like a grid having a plurality of intersecting ribs 37 forming between them depressions 38. As the valve member wears in the casing, the surfaces of the ribs 37 constitute the valve seat. The depressions 38 provide spaces for lubricant, such as graphite or heavy grease, thereby lubricating the valve member during its rotation and at the same time assisting in forming an air-tight joint between the valve member and the casing. A valve casing of this type is illustrated in Figs. 4 and 5, the valve casing being otherwise the same as that shown in Figs. 2 and 3.

Figs. 6 to 9 inclusive, illustrate the use of a conical valve member 39 instead of the cylindrical valve members 4 and 4' shown in Figs. 2 to 5, inclusive. The conical valve member 39 which decreases in diameter from top to bottom naturally tends to wear by gravity in its correspondingly shaped casing and thus to maintain at all times a tight seat. Except for its conical shape the valve member 39 is preferably the same as the valve member 4 and hence the same reference numerals are employed to designate corresponding parts. It will be seen that the features of multiple stage evacuation of the pockets, vacuum sealing grooves, and evacuated areas to compensate for unbalanced pressures, are all preferably employed in conjunction with the conical valve member. It is desirable to compensate partially for the effects of gravity in order to prevent excessive wear of the valve member and seat while at the same time taking advantage of the effects of gravity to obtain a tight joint between the valve member and the casing. Accordingly means are provided whereby the rotation of the valve member in the casing tends to lift the valve member with respect to the casing and against the force of gravity, while the valve member is suitably supported so that it is capable of vertical movement with respect to the seat. In order to compensate partially the effects of gravity, the inner surface of the valve casing may be provided with ribs 40, as shown in Fig. 8, which are inclined to the horizontal in such a direction that the rotating valve member tends to be screwed or threaded upwardly out of its seat by virtue of the friction between said ribs and the surface of the valve member. The supporting means for the valve member is preferably resilient and capable of adjustment, the resilient force being exerted on the valve member in a direction to oppose the force of gravity thereon. In the form shown, the valve stem 41 is provided with a collar 42 and a projecting end 43 that is preferably squared and engages in a similarly squared slot or opening 44 in the end of a shaft 45 on which the gear 3' is mounted. By virtue of the squared end 43 and slot 44, the valves 39 and shaft 45 rotate together but are capable of relative vertical movement. Suitable resilient means, such as a coil spring 46, are interposed between the collar 42 of the valve stem and an adjusting nut 47 and lock nut 48 on the shaft 45. The inclination of the ribs 40 is adjusted so that the threading or screwing action tending to lift the valve member compensates only partially for the effects of gravity and a part of the weight of the valve member is also compensated by the resilient means 46, the compensation afforded by these two means being such that the advantages of a tight joint between the valve member and the casing are obtained without too great wear of the valve member and the casing. In the event of changed conditions due for example to wear of the valve member in the casing, expansion or contraction with changes of temperature, and like causes, the tension of the resilient means 46 can be adjusted by means of the adjusting nut 47 so that the valve member 39 and its casing are always maintained in proper relation.

In operation the filled cans are continuously fed to the valve member 4 (or 39) by means of the conveyor 7 and are inserted one by one in the pockets 8 of the valve by means of the arm 9 which operates in timed relation with the rotation of the valve. As each pocket and the contained can rotate from the filling opening 19 in the direction of the arrow 10, the slot 25 comes into registry with the groove 21 whereby the filled pocket is connected with a highly evacuated pocket which has just left the seaming chamber 1 and the filled pocket is partially evacuated. As the valve member continues to rotate, the slot 25 comes into registry with the groove 23 whereby the pocket is further evacuated to approximately 27½ inches, and then comes into registry with the groove 26 whereby the final evacuation of the pocket is accomplished, the remaining air in the pocket rushing out rapidly into the expansion chamber 28. In this way the vacuum in the pocket can be increased to approximately 29½ inches before the pocket comes into communication with the seaming chamber.

The can is now delivered to the seaming mechanism and after the seaming operation is fed to one of the pockets of the exit valve 4' (or 39'). The filled and highly evacuated pocket of the exit valve first comes into communication with the groove 20 which is connected by pipe 22 to the groove 21, and as the valve continues to rotate the pocket reaches the opening 19 and the filled and seamed can is delivered to the conveyor 13. The empty pocket then comes into communication with groove 21 whereby it is partially evacuated, and then in succession with grooves 23 and 26 whereby the evacuation is continued as described above in connection with the inlet valve. Hence the pockets of the exit valve are evacuated to approximately 29½ inches before they come into communication with the seaming chamber. As a result of these means for vacuumizing the valve pockets, the amount of air which is carried into the seaming chamber is reduced to a minimum and as a result the vacuum in the seaming chamber is maintained very efficiently by the pump 29 and the two-stage pump 15, 17. The pressure in the seaming chamber may be maintained as low as one or two millimeters of mercury and substantially all of the air can be exhausted from the can before it is seamed.

The primary source of leakage into the seaming chamber in apparatus of this kind is the rotating valve mechanism. The invention provides means for eliminating substantially all leakage past the valves. The pockets of the valve members are evacuated to a high degree so that substantially no air is carried thereby into the seaming chamber. Leaks past the valve into the pockets or into the seaming chamber itself are prevented by the sealing grooves formed in the valve casings and the joint between each rotating valve and casing may be made substantially airtight by the additional provision of the grid-like surface of the valve casing and/or the use of a conical valve member. At the same time, mechanical difficulties which might result in excessive wear, defective operation, and consequent leakage are substantially all eliminated, such as excessive wear, unbalanced wear, etc. Accordingly the apparatus is capable of long and sustained usage with continued efficiency.

One of the difficulties encountered in applying a very high vacuum to materials such as ground coffee is that if the filled can is suddenly subjected to an extremely high vacuum, the coffee in the can tends to be drawn out and may get into the can seams so that imperfect seals are obtained. With an apparatus embodying the present invention, the vacuum is applied slowly and by stages until the greater part of the air has been removed. For instance, the first vacuumizing operation which takes place by means of pipe 22 results in withdrawing only about half of the air from the container and pocket, and the second vacuumizing operation which takes place by means of pipe 24 increases the vacuum to about 27½ inches. This vacuum is obtained gradually so that no displacement of the materials in the container takes place. The increase in vacuum from 27½ inches to 29½ inches may now be obtained as rapidly as possible, because the remaining air is so rarefied that the contents of the container are not disturbed by its rapid withdrawal. Hence, expansion chambers 28 are employed to effect almost instantaneous evacuation of the greater part of the remaining air. When the can is finally delivered to the seaming chamber, it is already evacuated to a very high value and the increase in vacuum after it enters the seaming chamber is not great enough to cause any disturbances in the contents of the can.

The arrangement of pumps as described above is particularly adapted for use with an apparatus embodying the present invention. The use of the two-stage pump enables the high vacuum desired to be obtained in the seaming chamber, whereas with a single pump it would be necessary to increase greatly the size of the pump. Moreover, the use of the two-stage pump provides two values of vacuum for the grooves 23 and 26, and the pockets and containers can be exhausted gradually and in stages with efficient and economical operation. However, as regards many features of the invention, it will be understood that any other suitable arrangement of the pumps may be substituted.

It will be understood that the invention is not limited to the form described and illustrated in the drawings, but may be applied to various vacuumizing apparatus, whether for packing coffee or for any other product, which embodies a rotating valve mechanism for delivering the containers to a seaming or can closing chamber. Similarly, the invention is not restricted to a vacuumizing apparatus employing two separate rotary valves as it is also applicable to apparatus wherein a single valve performs the functions of delivering containers to the seaming chamber and of removing them from the seaming chamber. Changes may also be made in the form, details of construction and arrangement of any of the parts without departing from the spirit of the invention, and reference is therefore to be had to the appended claims for a definition of the limits of the invention.

What is claimed is:—

1. In vacuumizing apparatus of the type embodying a vacuum chamber containing mechanism for sealing a container and a pair of pocketed rotary valve members one for carrying containers into said chamber and the other for removing containers from said chamber, a valve casing for each of said rotary valve members, each of said casings having a plurality of grooves formed in and circumferentially spaced about the inner surface thereof and lying in a plane axially spaced beyond the limits of the pockets of the associated valve member, vacuumizing means, said means being similarly connected to the grooves of said valve casings to provide different values of vacuum in the various grooves of each valve casing, and said valve members having passages connected to said pockets and arranged to register with said grooves in succession, the outlet ends of said passages registering with said grooves being of less extent peripherally of said valve members than said pockets, whereby a pocket in either valve member is subjected in stages to successively increasing vacuum.

2. In vacuumizing apparatus of the type embodying a vacuum chamber containing mechanism for sealing a container and a pocketed rotary valve member for carrying containers into said chamber, a valve casing having a pair of grooves formed in and circumferentially spaced about the inner surface thereof, a two-stage vacuum pump, means connecting the high vacuum stage of said pump to one of said grooves, and means for connecting the low vacuum stage of said pump to the other groove, said pockets being adapted to register with said grooves in succession.

3. In vacuumizing apparatus of the type embodying a vacuum chamber containing mechanism for sealing a container and a pocketed rotary valve member for carrying containers into said chamber, a valve casing having a pair of grooves formed in and circumferentially spaced about the inner surface thereof, a two-stage vacuum pump, means connecting the high vacuum stage of said pump to one of said grooves, a booster pump in the line between said chamber and high vacuum stage, and means for connecting the low vacuum stage of said pump to the other groove, said pockets being adapted to register with said grooves in succession.

4. In vacuumizing apparatus of the type embodying a vacuum chamber containing mechanism for sealing a container and a pocketed rotary valve for carrying containers into said chamber, a rotary valve means comprising a rotating cylinder, a casing in which said cylinder rotates, pockets formed in the periphery of said cylinder of less height than the cylinder wall, said cylinder having a passage leading from each pocket to a point on the cylinder surface above the top of said pocket and said casing having a plurality of circumferentially spaced vacuumized grooves coplanar with the outer ends of said passages with which said passages are adapted to register as the cylinder rotates, the outlet ends of said passages registering with said grooves being of less extent peripherally of said cylinder than said pockets.

5. In vacuumizing apparatus of the type embodying a vacuum chamber containing mechanism for sealing a container and a rotary valve member having pockets for carrying containers into and out of the chamber, a valve casing having an opening therein through which containers may be passed, a plurality of grooves formed in and circumferentially spaced about the inner surface of said casing, a by-pass connecting grooves on opposite sides of said opening whereby a vacuumized pocket may be connected with an air filled pocket, and vacuumizing means connected to a plurality of said grooves to provide different values of vacuum therein and connected to said chamber, said pockets being arranged to register with said grooves in succession.

6. In vacuumizing apparatus of the type embodying a vacuum chamber containing mechanism for sealing a container and pocketed rotary valve members for carrying containers into and out of said chamber, a valve casing having a plurality of grooves formed in and circumferentially spaced about the inner surface thereof and an opening through which said containers may be passed, means connecting grooves on opposite sides of said opening, a two-stage vacuum pump, and means connecting the high and low vacuum stages of said pump to other of said grooves, said pockets being arranged to register with said grooves in succession.

7. In vacuumizing apparatus of the type embodying a vacuum chamber containing mechanism for sealing a container and rotary valve members having pockets for carrying containers into and out of the chamber, a valve casing having an opening therein through which containers may be passed, a plurality of grooves formed in and circumferentially spaced about the inner surface of said casing, a by-pass connecting grooves on opposite sides of said opening whereby a vacuumized pocket may be connected with an air filled pocket, vacuumizing means connected to a plurality of said grooves to provide different values of vacuum therein, said pockets being arranged to register with said grooves in succession, and an evacuated expansion chamber connected to the last of said grooves.

8. In vacuumizing apparatus of the type embodying a vacuum chamber containing mechanism for sealing a container and pocketed rotary valve members for carrying containers into and out of said chamber, a valve casing having a plurality of grooves formed in and circumferentially spaced about the inner surface thereof and an opening through which said containers may be passed, means connecting grooves on opposite sides of said opening, a two-stage vacuum pump, means connecting the high and low vacuum stages of said pump to other of said grooves, said pockets being arranged to register with said grooves in succession, and an evacuated expansion chamber connected to the high vacuum groove.

9. In vacuumizing apparatus of the type embodying a vacuum chamber containing mechanism for sealing a container and rotary valve members having pockets for carrying containers into and out of said chamber, a valve casing having a plurality of grooves formed in and circumferentially spaced about the inner surface thereof, vacuumizing means, said means being connected to said grooves to provide different values of vacuum therein, said pockets being arranged to register with said grooves in succession whereby a pocket and its container are subjected in stages to successively increasing values of vacuum, and an evacuated expansion chamber connected to the last of said grooves.

10. In vacuumizing apparatus of the type embodying a vacuum chamber containing mechanism for sealing a container and a pocketed rotary valve member for carrying containers into said chamber, a valve casing having a pair of grooves formed in and circumferentially spaced about the inner surface thereof, a two-stage vacuum pump, means connecting the high vacuum stage of said pump to one of said grooves, means for connecting the low vacuum stage of said pump to the other groove, said pockets being adapted to register with said grooves in succession, and an evacuated expansion chamber connected to the high vacuum groove.

11. In vacuumizing apparatus of the type embodying a vacuum chamber containing mechanism for sealing a container and a rotary valve member having pockets for carrying containers into said chamber, a valve casing having a plurality of grooves formed in and circumferentially spaced about the inner surface thereof, vacuumizing means, said means being connected to said grooves to provide different values of vacuum therein, said pockets being arranged to register with said grooves in succession whereby a pocket and its container are subjected in stages to successively increasing values of vacuum, a sealing groove formed in said casing, and vacuumizing means for the sealing groove.

12. In vacuumizing apparatus of the type embodying a vacuum chamber containing mechanism for sealing a container and a pocketed rotary valve member for carrying containers into said chamber, a valve casing having a pair of grooves formed in and circumferentially spaced about the inner surface thereof, a two-stage vacuum pump, means connecting the high vacuum stage of said pump to one of said grooves, means for connecting the low vacuum stage of said pump to the other groove, said pockets being adapted to register with said grooves in succession, a sealing groove formed in the valve casing, and a separate vacuum pump connected to the sealing groove.

13. In vacuumizing apparatus of the type embodying a vacuum chamber containing mechanism for sealing a container, a pocketed rotary valve member extending into said chamber, a valve casing surrounding said valve member externally of said chamber, means for evacuating the pockets of said valve member during rotation in said casing, whereby an unbalanced pressure is set up on said valve member, a pocket formed in said valve casing, and means for evacuating said pocket, said pocket being so positioned and having sufficient area that said unbalanced pressure is compensated.

14. In vacuumizing apparatus of the type embodying a vacuum chamber containing mechanism for sealing a container, a pocketed rotary valve member extending partially within said chamber, a valve casing surrounding said valve member externally of said chamber, means for vacuumizing the pockets of said valve member during rotation in said casing, a sealing groove extending around said casing, and means for vacuumizing said groove, said groove being enlarged to form a pocket so positioned and of such area that the pressures on said valve member are balanced.

15. In vacuumizing apparatus of the type embodying a vacuum chamber containing mechanism for sealing a container, a pocketed rotary valve for carrying containers into said chamber, a casing in which said valve member rotates, pockets formed in the periphery of the valve member, grooves formed in the valve casing, and means for vacuumizing said grooves whereby the pockets are evacuated during rotation in the casing, said casing having a grid-like inner surface.

16. In vacuumizing apparatus of the type embodying a vacuum chamber containing mechanism for sealing a container, a pocketed rotary valve for carrying containers into said chamber, a casing in which said valve member rotates, pockets formed in said valve member, a plurality of grooves formed in the casing with which said pockets are adapted to register during rotation, means for vacuumizing said grooves, a pair of sealing grooves extending entirely around said casing adjacent the top and bottom of said rotating valve member, and means for evacuating said sealing grooves.

17. In vacuumizing apparatus of the type embodying a vacuum chamber containing mechanism for sealing a container, a pocketed rotary valve for carrying containers into said chamber, a casing in which said valve member rotates, pockets formed in said valve member, a plurality of grooves formed in the casing with which said pockets are adapted to register during rotation, means for vacuumizing said grooves, a pair of sealing grooves extending entirely around said casing adjacent the top and bottom of said rotating valve member, and means for evacuating said sealing grooves, said casing having a grid-like inner surface providing a plurality of depressions for a lubricating and sealing medium.

18. In vacuumizing apparatus of the type embodying a vacuum chamber containing mechanism for sealing a container, a conical rotary valve for carrying containers into said chamber, a correspondingly shaped valve casing, pockets formed in said rotating valve member, a plurality of openings formed in said casing with which said pockets register, means for evacuating said pockets, said casing having a grid-like inner surface having ribs inclined to the horizontal whereby the valve member tends to be threaded out of its casing against the force of gravity.

19. In vacuumizing apparatus of the type embodying a vacuum chamber containing mechanism for sealing a container, a rotating conical valve member extending partially into said chamber, a conical valve casing, pockets formed in said valve member, means for evacuating said pockets, a pocket formed in said casing, and means for vacuumizing said pocket, said pocket being so positioned and of such area that the pressures on said valve member are balanced.

20. In vacuumizing apparatus of the type embodying a vacuum chamber containing mechanism for sealing a container, a rotating valve member extending partially into said chamber, a valve casing, pockets formed in said valve member, means for evacuating said pockets, a sealing groove in said casing, and means for evacuating said sealing groove.

21. In vacuumizing apparatus of the type embodying a vacuum chamber containing mechanism for sealing a container, a rotating conical valve member extending partially into said chamber, a conical valve casing, pockets formed in said valve member, means for evacuating said pockets, a sealing groove in said casing, and means for vacuumizing said groove, said groove being enlarged to form a pocket so positioned and of such area that the pressures on said valve member are balanced.

22. In vacuumizing apparatus of the type embodying a vacuum chamber containing mechanism for sealing a container, a rotating conical valve member extending partially into said chamber, a conical valve casing, pockets formed in said valve member, means for evacuating said pockets, a pocket formed in said casing, and means for vacuumizing said pocket, said pocket being so positioned and of such area that the pressures on said valve member are balanced, said casing having a grid-like inner surface having ribs inclined to the horizontal whereby said valve member tends to be threaded out of its casing against the force of gravity.

23. The combination of a conical rotary valve member and a conical valve seat therefor, said valve seat having ribs formed on its inner surface and constituting the valve seat, said ribs being inclined to the horizontal in such a direction that said valve member tends to be threaded out of its seat against the force of gravity.

24. The combination of a conical rotary valve member and a conical valve seat therefor, means operative only upon rotation of said valve member tending to lift said valve member with respect to its seat, and additional means for resiliently urging said valve member upwardly from its seat against the force of gravity.

25. The combination of a conical rotary valve member and a valve casing therefor, a plurality of ribs formed on the inner surface of said casing and constituting a valve seat for said valve member, said ribs being inclined to the horizontal in such a direction that the valve member tends to be lifted with respect to its seat on rotation, and a resilient support for said valve member.

26. The combination of a conical rotary valve member and a conical valve casing therefor, a plurality of ribs formed on the inner surface of said casing and constituting a valve seat for said valve member, said ribs being inclined to the horizontal in such a direction that the valve member tends to be lifted with respect to its seat on rotation, resilient means supporting said valve member, and means for adjusting the tension of said resilient means.

THOMAS M. RECTOR.